UNITED STATES PATENT OFFICE.

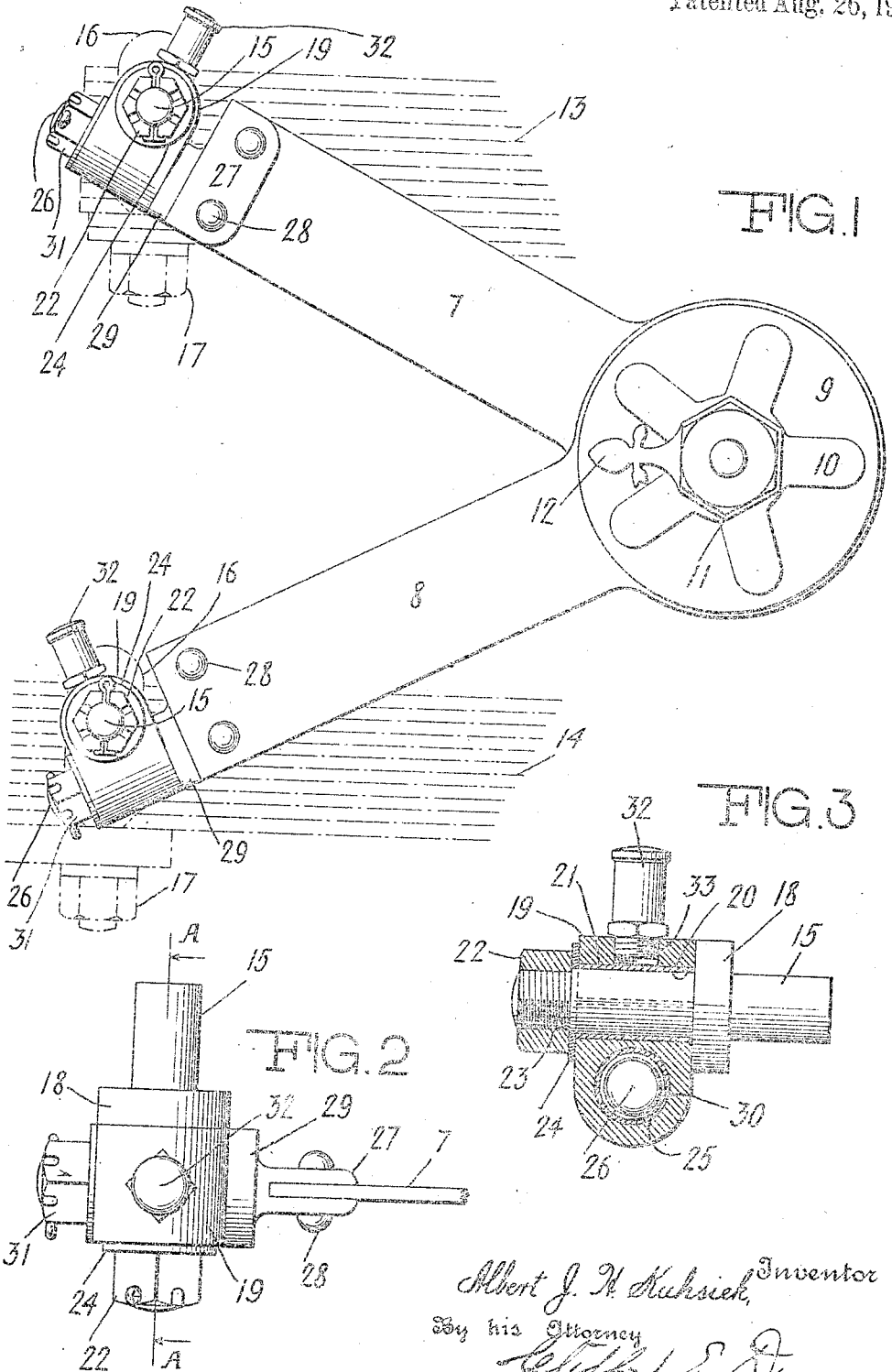

ALBERT J. H. KUHSIEK, OF RICHMOND HILL, NEW YORK, ASSIGNOR TO EDWARD V. HARTFORD, INC., A CORPORATION OF NEW YORK.

ATTACHING DEVICE FOR SHOCK-ABSORBERS AND THE LIKE.

1,314,272.     Specification of Letters Patent.     Patented Aug. 26, 1919.

Application filed March 20, 1917. Serial No. 156,111.

*To all whom it may concern:*

Be it known that I, ALBERT J. H. KUHSIEK, a citizen of the United States, residing at Richmond Hill, county of Queens, city and State of New York, have invented certain new and useful Improvements in Attaching Devices for Shock-Absorbers and the like, of which the following, taken in connection with the accompanying sheet of drawings, is a full, clear, and concise description thereof.

The present invention relates generally to improvements in shock absorbing devices for motor vehicles, and is more particularly directed to the provision of a means for connecting the shock absorbing devices to the oppositely relatively movable parts of the vehicle, such, for instance, as the upper and lower spring sections, or one of the spring sections, or the axle and the body of the vehicle.

As is well known, there are various types of shock absorbing devices employed in connection with motor vehicles, to retard the recoil of the suspended parts. One of the most efficient forms of these devices in use at the present time is that known as the friction type, wherein a pair of arms designed to operate in parallel planes are provided for connection to the spring and body portions of the vehicle, respectively. The arms which have a pivotal connection with the adjacent parts of the vehicle suspension carry or support a centrally located friction member made up of a plurality of disks, the surfaces of which are maintained in close and constant frictional contact, the resistance offered by this friction member serving to slow or retard the action of the springs on the recoil. It is obvious that under normal conditions of rest the arms of the shock absorber will lie in parallel planes, so that the entire areas of the surfaces of the friction members will be in constant contact. Similar conditions will prevail when the vehicle is in operation on smooth road beds and running at a comparatively low rate of speed. However, as is well known, as the speed of the car increases and inequalities of the road bed are encountered, side sway will develop and as the chassis and vehicle body move relatively laterally to each other in different directions, the attaching or supporting arms of the shock absorber will be thrown out of their parallelism to each other causing a canting of the friction member which will throw the friction devices partly out of contact with each other, thereby diminishing the efficiency of the shock absorbing device. Heretofore, in attaching the shock absorbing devices to the vehicle parts, it has been customary to mount the ends of the attaching arms on studs fastened to the chassis and body, respectively, or to other suitable parts of the vehicle suspension, the arms having a free rotary movement on the studs on an axis parallel to the axis on which the main friction members move. It is manifest from this construction that no provision is made for the side sway of the vehicle parts as described, and the primary object of the present invention is to provide means for attaching the supporting arms of the shock absorbing device to the suspended parts of the vehicle in such a manner that the friction members will be in constant contact under any and all conditions of operation of the vehicle.

A further object of the present invention is to provide an attaching means for shock absorbers of various types which may be economically produced and applied to the various parts and which will be capable of movement in a plurality of directions so as to maintain the supporting members and the friction member of the shock absorber in their relative operating positions regardless of the direction or degree of movement of the parts of the vehicle to which the supporting arms are attached.

Further objects and advantages of my invention will become apparent as I proceed with the description thereof, and I would have it distinctly understood that I do not limit myself to the application of my invention to shock absorbing devices of the friction type, as it is obvious that it may be incorporated in other forms of devices of the same general character and, in fact, may be employed in connection with the mounting of any machine or other parts where a semi-universal joint or connection is desirable, without departing from the spirit and scope of my invention.

I shall now proceed to describe my invention with reference to the accompanying drawings wherein I have shown one embodiment thereof used in conjunction with a shock absorber of a conventional type, such as hereinbefore described, and then point out with more particularity the essential elements of novelty in the appended claims.

In the drawings—

Figure 1 is a side elevation of a shock absorber of the friction type illustrating the employment of my invention in connection therewith.

Fig. 2 is a plan view of my improved form of connection; and

Fig. 3 is a section taken on the line A—A of Fig. 2.

Referring now to the drawings in detail in which like characters of reference are employed to designate similar parts throughout the several views, 7 and 8 represent the supporting arms of a shock absorber of the friction type, these arms terminating in enlarged annular portions between which are positioned a plurality of disks or plates forming the friction member 9. The parts of the friction member are held in constant contact by means of the spider spring 10 locked in position by the nut 11, an indicator being provided, as shown at 12, to permit of the adjustment of the spring to the tension desired. All of the parts just described do not form a part of my present invention, and hence it is unnecessary for me to go into a detailed description of the method of building up the friction member and the specific operation thereof, since they are well known to those skilled in the art to which this invention pertains.

In the present showing, the arms 7 and 8 of the shock absorbing device are connected to the upper and lower sections of the spring fragments of which are shown in dotted lines at 13 and 14. As the attaching means are identical in construction and operation I shall describe but one of them, it being understood that this description applies to both of those illustrated in the drawing. The stud 15, which may be made of steel or any material suitable for the purpose, is formed integral with or otherwise rigidly secured to a yoke 16 which is clamped to the spring 13 and secured in position by the nut 17, as shown in dotted lines in Fig. 1. This stud is provided intermediate of its ends with an enlarged annular portion 18 which abuts against the clamping member and forms a bearing for the housing 19 which is preferably of the configuration clearly shown in Fig. 3, and is provided with a bore 20 for the reception of the free end of the stud 15, the housing being capable of a rotary movement on said stud. In order to prevent play between the bore of the housing 19 and the stud 15, I have found it expedient to insert a bushing 21. When the housing is positioned on the stud as just described, it is held against the bearing surface of the enlarged portion 19 by means of the castle nut 22 adapted to engage the threads 23 of the outer or free end of the stud 15, a washer 24 being interposed between the outer face of the housing and the nut 22. When the nut has been tightened up sufficiently a cotter pin 24 is employed in the usual manner to lock the same against working loose by reason of the vibration and movement of the parts.

Below the bore 20 and extending at right angles thereto in the housing 19 is a second bore 25 for the reception of the stud member 26 terminating in an enlarged plate portion 27 adapted to be riveted to or otherwise rigidly secured to the extremity of the arm 7, as shown at 28. This stud 26 similarly to the stud 15 is provided with an annular enlargement 29 forming a bearing surface for the contiguous portion of the housing 18. The bore 25 is provided with a bushing 30 to prevent vibratory movement of the stud 26 within the bore and the end of the stud 26, similarly to the stud 15, is threaded for the reception of the locking nut 31, the housing being fastened in position on this stud in the same manner as that described in connection with the adjustment of the nut 22.

It is obvious that by the construction of my improved attaching means and the method of attaching the housing to the suspended parts and to the supporting arms, that the arms will not only be capable of movement on an axis parallel to the axis of movement of the friction member 9 but on an axis at a right angle to the axis of movement of said member 9, so that regardless of the relative movements of the suspended parts of the vehicle, the arms 7 and 8 will always move in parallel planes thereby maintaining the entire contacting surfaces of the parts composing the friction member 9 in constant working contact.

By the employment of the bushings 21 and 30 any wear that might take place between the studs 15 and 26 and their bearings will be compensated for and a durable and efficient structure produced, ease of operation being further enhanced by the application of a suitable lubricant through the oil cup 32 threaded into the top of the housing 19, as shown at 33.

As the arms 7 and 8 approach or recede from each other by the relative movements of the suspended parts, the housing 19 will rotate on the studs 15 and if during the movement there should be any tendency of the suspended parts to move in other than parallel planes and develop what is commonly known as side sway, this movement will be taken care of by the studs 26 rotating within the housing and keeping the arms 7 and 8 in alinement, as heretofore described.

While I have described my invention with reference to the specific showing herein, I reserve unto myself the full range of equivalents in structural details and uses to which I may be entitled under my invention in its broadest aspect.

Having thus described my invention what I claim as new and desire to secure by Letters Patent, is:

1. The combination with a shock absorbing device for motor vehicles having relatively movable members, of means for attaching said members to relatively movable parts of the vehicle, said means comprising a single member having superposed bearings extending therethrough in planes at right angles to each other, a stud fixed to one of said shock absorbing members and provided with a shoulder, a similarly formed stud rigidly secured to a part of the vehicle, said studs being adapted to be connected by said attaching member and rotating within the respective bearings formed therein, bushings disposed within said bearings and surrounding said studs, a lock washer and a securing nut for threaded engagement with each of said studs whereby said attaching member is held in functioning position on the studs between the respective shoulders and the washers carried by the studs.

2. The combination with a shock absorbing device for motor vehicles, having a friction member and actuating arms for functioning said member, of means for attaching the free ends of said arms to relatively movable parts of the vehicle, said means comprising a stud fixed to the end of the actuating arm and extending longitudinally therefrom, a stud rigidly fastened to a part of the vehicle and projecting laterally therefrom, a connecting member having bearings formed therein to receive said studs, said bearings being superposed in planes at right angles to each other, wear compensating bushings positioned in said bearings, and means communicating with the interior of said bearings for lubricating the coöperating parts.

3. The combination with a shock absorbing device for motor vehicles having a friction member and relatively movable arms for functioning said member, of means for attaching the free ends of said arms to relatively movable parts of the vehicle, said means comprising a single member having superposed bearings extending through said member in planes at right angles to each other, a stud fixed to the end of the arm and provided with a shoulder, a similarly formed stud rigidly secured to a part of the vehicle, said studs being adapted to be connected by said member and rotating within the respective bearings formed therein, wear compensating bushings disposed within said bearings and surrounding said studs, a lock washer and a securing nut for threaded engagement with each of said studs, whereby said conecting member is held in functioning position on the studs between the respective shoulders and washers thereof.

4. The combination with a shock absorbing device for motor vehicles having a friction member and relatively movable arms for functioning said member, of means for attaching the free ends of said arms to relatively movable parts of the vehicle, said means comprising a single member having superposed bearings extending through said member in planes at right angles to each other, a stud fixed to the end of the arm and provided with a shoulder, a similarly formed stud rigidly secured to a part of the vehicle, said studs being adapted to be connected by said member and rotating within the respective bearings formed therein, wear compensating bushings disposed within said bearings and surrounding said studs, and means carried by each of said studs, whereby said connecting member is held in functioning position on the studs between the respective shoulders and the latter means, said means being adjustable to regulate the friction imposed thereby and by the coöperating shoulder of the connecting member.

5. The combination with a shock absorbing device for motor vehicles having a retardative action, of means for connecting said device to relatively movable parts of the vehicle, said means comprising a stud fixed to a part of said device and extending longitudinally therefrom, a stud rigidly fastened to a part of the vehicle and projecting laterally therefrom, a connecting member having bearings formed therein to receive said studs, said bearings being superposed in planes at right-angles to each other, bushings positioned in said bearings, and means for retaining said connecting member in functioning position on said studs, said means being adjustable to interpose a resistance to the free movement of said member.

ALBERT J. H. KUHSIEK.